(12) United States Patent
Kim

(10) Patent No.: US 12,284,252 B2
(45) Date of Patent: Apr. 22, 2025

(54) EDGE CONFIGURATION SERVER, EDGE ENABLE SERVER, AND OPERATING METHODS THEREFOR

(71) Applicant: SK TELECOM CO., LTD., Seoul (KR)

(72) Inventor: Keun Hyun Kim, Seoul (KR)

(73) Assignee: SK Telecom Co., Ltd., Seoul (KR)

( * ) Notice: Subject to any disclaimer, the term of this patent is extended or adjusted under 35 U.S.C. 154(b) by 0 days.

(21) Appl. No.: 18/034,128

(22) PCT Filed: Sep. 23, 2021

(86) PCT No.: PCT/KR2021/012956
§ 371 (c)(1),
(2) Date: Apr. 27, 2023

(87) PCT Pub. No.: WO2022/102949
PCT Pub. Date: May 19, 2022

(65) Prior Publication Data
US 2023/0396680 A1 Dec. 7, 2023

(30) Foreign Application Priority Data
Nov. 13, 2020 (KR) .......... 10-2020-0152064

(51) Int. Cl.
*H04L 67/145* (2022.01)
*H04L 67/51* (2022.01)
*H04L 67/568* (2022.01)

(52) U.S. Cl.
CPC .......... *H04L 67/145* (2013.01); *H04L 67/51* (2022.05); *H04L 67/568* (2022.05)

(58) Field of Classification Search
CPC ..... H04L 67/145; H04L 67/51; H04L 67/568; H04L 65/40; H04L 67/147; H04L 67/289; H04L 67/52
USPC .......................................... 709/227
See application file for complete search history.

(56) References Cited

U.S. PATENT DOCUMENTS

| 2012/0224677 A1* | 9/2012 | Riley | .......... H04L 12/1407 379/93.01 |
| 2020/0252449 A1* | 8/2020 | Wood | ............ H04L 67/01 |

FOREIGN PATENT DOCUMENTS

| CN | 111048088 A | * | 4/2020 | |
| CN | 111061453 A | * | 4/2020 | .......... G06F 3/167 |
| CN | 113572835 A | * | 10/2021 | .......... H04L 61/4511 |
| KR | 10-2011-0120651 | | 11/2011 | |
| KR | 10-2016-0103814 | | 9/2016 | |

(Continued)

OTHER PUBLICATIONS

International Search Report dated Dec. 23, 2021 issued in Application No. PCT/KR2021/012956.

(Continued)

*Primary Examiner* — David R Lazaro
*Assistant Examiner* — Mariegeorges A Henry
(74) *Attorney, Agent, or Firm* — KED & Associates LLP

(57) ABSTRACT

The present disclosure relates to an edge configuration server, an edge enable server, and an operating methods thereof capable of minimizing signaling required for reconnection of a terminal device in an edge computing (multi-access edge computing: MEC) service environment in which an edge computing service is available through an edge cloud site (MEC site) closest to a network connection location of the terminal device.

19 Claims, 7 Drawing Sheets

(56) References Cited

FOREIGN PATENT DOCUMENTS

| KR | 10-2020-0007754 | 1/2020 |
| KR | 10-2020-0115333 | 10/2020 |
| KR | 102178348 B1 * | 11/2020 |

OTHER PUBLICATIONS

3GPP; TSG SA; Architecture for enabling Edge Applications; (Release 17). 3GPP TS 23.558 V1.0.0. Sep. 13, 2020.
3GPP, TS23.558 v1.1.0, Architecture for enabling Edge Applications; 3GPP (Oct. 25, 2020).
Korean Office Action dated Nov. 24, 2023 issued in Application No. 10-2020-0152064.

* cited by examiner

EDGE CONFIGURATION SERVER, EDGE ENABLE SERVER, AND OPERATING METHODS THEREFOR

CROSS-REFERENCE TO RELATED PATENT APPLICATIONS

This application is a U.S. National Stage Application under 35 U.S.C. § 371 of PCT Application No. PCT/KR2021/012956, filed Sep. 23, 2021, which claims priority to Korean Patent Application No. 10-2020-0152064, filed Nov. 13, 2020, whose entire disclosures are hereby incorporated by reference.

TECHNICAL FIELD

The present disclosure relates to a method for minimizing signaling required for reconnection of a terminal device in an edge computing (multi-access edge computing: MEC) service environment in which an edge computing service is available through an edge cloud site (MEC site) closest to a network connection location of the terminal device.

This application is based on and claims priority to Korean Patent Application No. 10-2020-0152064, filed on Nov. 13, 2020, in the Korean Intellectual Property Office, the disclosure of which is herein incorporated by reference in its entirety.

BACKGROUND

In an existing mobile communication network, all traffic generated in a terminal device is generally transmitted to a central SP-GW (SGW and PGW) for mobility management, billing, and the like.

In this centralized network structure, services, such as a call (IMS), Internet access, and messaging/video through various portals/OTTs, which are mostly used in terminal devices (e.g., smartphones), are not very sensitive to a delay and have a low capacity of at most dozens of Mbps, and thus are used without any problem.

However, in recent years, a wide range of terminal devices from a conventional smartphone (human being) to things including a car, a drone, a sensor, a VR headset, a camera, and a robot have been connected to a mobile communication network, and services requested by each terminal device require an ultra-low latency (RTT) of a few ms to 10 ms and a high-capacity bandwidth from hundreds of Mbps to several Gbps per stream.

As a technology for meeting these requirements, edge computing technology is attracting attention because edge computing is capable of accommodating ultra-low latency and high-capacity applications by deploying computing functions for an application service in an edge cloud site (MEC site) close to a terminal device.

In an edge computing service environment, a plurality of edge cloud sites may exist near a terminal device depending on the location of the terminal device and the performance of a service that each edge cloud site is able to provide may significantly change depending on the distance between the terminal device and each edge cloud site.

Accordingly, the present disclosure proposes a new method for enabling a terminal device to use an edge computing service through an edge cloud site closest to the terminal device and for minimizing signaling required for reconnection of the terminal device, particularly in an edge computing service environment.

DISCLOSURE

Technical Problem

The present disclosure has been made in view of the above-mentioned circumstances, and an aspect of the present disclosure is to minimize signaling required for reconnection of a terminal device in an edge computing service environment in which an edge computing service is available through an edge cloud site closest to a network connection location of the terminal device.

Technical Solution

In view of the foregoing, an edge configuration server (ECS) according to an embodiment of the present disclosure includes: a determination unit configured to determine whether a terminal device requested to connect to an edge application reconnects to the edge application; and an induction unit configured to induce connection to an edge enable server (EES) managing the edge application in an edge cloud site closest to a network connection location in initial connection of the terminal device according to session management information cached for the terminal device when reconnection of the terminal device is determined.

Specifically, the session management information may be identified from first connection information, which is connection information previously allocated to the terminal device in an initial connection process of the terminal device, and may include second connection information, which is connection information about the edge enable server to which the terminal device previously connects in the initial connection of the terminal device to the edge application.

Specifically, the first connection information may include connection information that an edge gateway (MEC-GW) identifying network connection of the terminal device differently allocates to the terminal device according to a service area in which the edge gateway is deployed, and the second connection information may include connection information about an edge enable server deployed in each edge cloud site in each service area of the edge gateway.

Specifically, the induction unit may transmit the second connection information in the session management information cached for the terminal device to the terminal device to induce the terminal device to connect to the edge enable server according to the second connection information when the reconnection of the terminal device is determined.

Specifically, the determination unit may determine that the terminal device initially connects when there is no session management information cached for the terminal device, and the induction unit may identify a specific service area in which an edge gateway (MEC-GW) identifying network connection of the terminal device is deployed from the first connection information that the edge gateway allocates to the terminal device, may transmit the second connection information, which is the connection information about the edge enable server deployed in the specific service area, to the terminal device, and may cache the session management information including the second connection information for the terminal device when the initial connection of the terminal device is determined.

Specifically, the session management information may further include a service policy determined for the terminal device in association with a business support system (BSS) according to subscription information about the terminal device.

To achieve the foregoing aspect, an edge enable server (EES) according to an embodiment of the present disclosure includes: a determination unit configured to determine whether a terminal device induced to connect to an edge cloud site closest to a network connection location reconnects to an edge application; and a support unit configured to support edge communication between at least one of edge applications managed in the edge cloud site and the terminal device according to session management information cached for the terminal device when reconnection of the terminal device is determined.

Specifically, the session management information may include a list of edge applications previously generated for the terminal device in an initial connection process of the terminal device, and the list may include at least one edge application matching an edge enable client (EEC) installed in the terminal device among the edge applications managed in the edge cloud site.

Specifically, the support unit may transmit the list in the session management information cached for the terminal device to the terminal device, and may support edge communication between the at least one application in the list and the terminal device when the reconnection of the terminal device is determined.

Specifically, the determination unit may determine that the terminal device initially connects when there is no session management information cached for the terminal device, and the support unit may generate a list of all edge applications managed in the edge cloud site to transmit the list to the terminal device, and may cache the session management information including a list of the identified at least one edge application matching the edge enable client (EEC) in the list of all edge applications upon identifying the at least one edge application from the terminal device when initial connection of the terminal device is determined.

Specifically, when error information is identified from periodic state management of at least one edge application matching an edge enable client (EEC) installed in the terminal device, the support unit may transmit the identified error information to an edge configuration server (ECS) that induces connection of the terminal device to enable the edge configuration server to induce connection of the terminal device to an edge cloud site other than the edge cloud site according to the error information.

To achieve the foregoing aspect, an operating method of an edge configuration server according to an embodiment of the present disclosure includes: determining whether a terminal device requested to connect to an edge application reconnects to the edge application; and inducing connection to an edge enable server (EES) managing the edge application in an edge cloud site closest to a network connection location in initial connection of the terminal device according to session management information cached for the terminal device when reconnection of the terminal device is determined.

Specifically, the session management information may be identified from first connection information, which is connection information allocated to the terminal device in an initial connection process of the terminal device, and may include second connection information, which is connection information about the edge enable server to which the terminal device connects in the initial connection of the terminal device to the edge application.

Specifically, the first connection information may include connection information that an edge gateway (MEC-GW) identifying network connection of the terminal device differently allocates to the terminal device according to a service area in which the edge gateway is deployed, and the second connection information may include connection information about an edge enable server deployed in each edge cloud site in each service area of the edge gateway.

Specifically, the inducing may include transmitting the second connection information in the session management information cached for the terminal device to the terminal device to induce the terminal device to connect to the edge enable server according to the second connection information when the reconnection of the terminal device is determined.

Specifically, the determining may include determining that the terminal device initially connects when there is no session management information cached for the terminal device, and the inducing may include identifying a specific service area in which an edge gateway (MEC-GW) identifying network connection of the terminal device is deployed from the first connection information that the edge gateway allocates to the terminal device, transmitting the second connection information, which is the connection information about the edge enable server deployed in the specific service area, to the terminal device, and caching the session management information including the second connection information for the terminal device when the initial connection of the terminal device is determined.

To achieve the foregoing aspect, an operating method of an edge enable server according to an embodiment of the disclosure includes: determining whether a terminal device induced to connect to an edge cloud site closest to a network connection location reconnects to an edge application; and supporting edge communication between at least one of edge applications managed in the edge cloud site and the terminal device according to session management information cached for the terminal device when reconnection of the terminal device is determined.

Specifically, the session management information may include a list of edge applications generated for the terminal device in an initial connection process of the terminal device, and the list may include at least one edge application matching an edge enable client (EEC) installed in the terminal device among the edge applications managed in the edge cloud site.

Specifically, the supporting may include transmitting the list in the session management information cached for the terminal device to the terminal device, and supporting edge communication between the at least one application in the list and the terminal device when the reconnection of the terminal device is determined.

Specifically, the determining may include determining that the terminal device initially connects when there is no session management information cached for the terminal device, and the supporting may include generating a list of all edge applications managed in the edge cloud site to transmit the list to the terminal device, and caching the session management information including a list of the identified at least one edge application matching the edge enable client (EEC) in the list of all edge applications upon identifying the at least one edge application from the terminal device when initial connection of the terminal device is determined.

Advantageous Effects

According to an edge configuration server, an edge enable server, and an operating methods thereof of the present disclosure, it is possible to use a service through the edge cloud site closest to the network connection location of the terminal device in the edge computing service environment, and to cache and manage the session management information about the terminal device in this process to thereby simplify signaling required in a reconnection process of the terminal device, based on the information in the session management information, thus reducing signaling processing loads and ensuring optimal service performance.

DESCRIPTION OF THE EMBODIMENTS

Hereinafter, exemplary embodiments of the present disclosure will be described with reference to the accompanying drawings.

An embodiment of the present disclosure relates to a multi-access edge computing (MEC) technology.

In an edge computing service environment, as computing for an application service is deployed in an edge cloud site (MEC site) close to a terminal device, an improvement in service performance, such as ultra-low latency and large-capacity application, may be expected.

In the edge computing service environment, a plurality of serviceable edge cloud sites may exist near the terminal device due to an environmental characteristic that an edge cloud is deployed close to the terminal device.

In this case, regarding the same service to be used by the terminal device, the performance of an edge computing service that each edge cloud site is able to provide may significantly change depending on the distance between the terminal device and each edge cloud site.

Accordingly, an embodiment of the present disclosure is to propose a new method for enabling use of an edge computing service through an edge cloud site closest to a network connection location of a terminal device.

In particular, an embodiment of the present disclosure is to propose a method for minimizing signaling in a reconnection process in order to resolve a service delay due to reconnection of a terminal device caused when the terminal device is disconnected from or changes an access network of the terminal device (e.g., 5G↔Wi-Fi) in an edge computing service environment.

Figure 1:
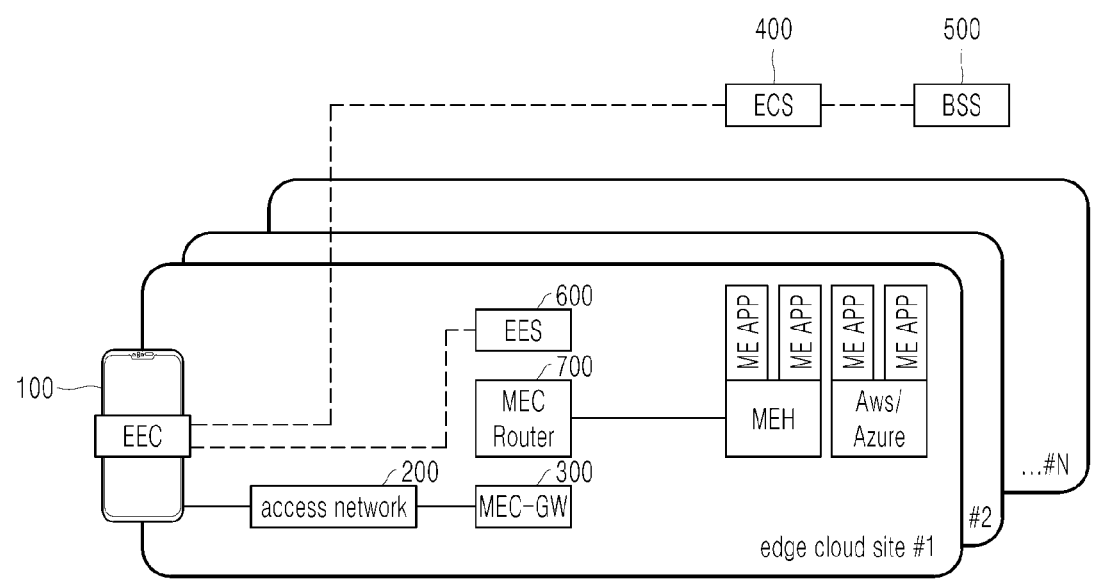
FIG. 1 illustrates an edge computing service environment according to an embodiment of the present disclosure.

FIG. 1 illustrates an edge computing service environment according to an embodiment of the present disclosure.

As illustrated in FIG. 1, the edge computing service environment according to the embodiment of the present disclosure may include an edge gateway (MEC-GW) 300 to allocate connection information for a terminal device 100 connected through an access network 200, an edge configuration server (ECS) 400 deployed in a central office to interwork with each edge enable client (EEC) installed in the terminal device 100, a business support system (BSS) 500 to determine a service policy for the terminal device 100, and an edge enable server (EES) 600 deployed in an edge cloud site.

In the edge cloud site according to an embodiment of the present disclosure, an edge router (MEC router) 700 to steer traffic for an edge application (ME App) installed in an edge host (MEH) or a public platform (AWS/Azure) may be further deployed.

The edge gateway 300 refers to a device that allocates connection information (IP) relating to connection to the edge cloud site for the terminal device 100 connected through the network, and may be understood as a packet gateway (PGW) in a 4G network and a component corresponding to a user plane function in a 5G network.

The edge enable client (EEC) in the terminal device 100 may retrieve the edge application existing in the edge cloud site, and may provide configuration data.

The edge configuration server 400 deployed in the central office may be understood as a component that provides edge data network configuration information to the edge enable client (EEC).

The edge enable server 600 deployed in the edge cloud site may be understood as a component that provides information related to the edge application, such as activation and related configurations, and supports a function of exposing a 3GPP network function to the edge application.

In the edge computing service environment according to the embodiment of the present disclosure, the foregoing configuration makes it possible to use an edge computing service through an edge cloud site closest to a network connection location of the terminal device 100 and to minimize signaling required for reconnection when the terminal device 100 is reconnected. Hereinafter, each component of the edge configuration server 400 and the edge enable server 600 to realize the foregoing will be described in more detail.

First, the configuration of the edge configuration server 400 according to an embodiment of the present disclosure is described hereinafter with reference to FIG. 2.

Figure 2:
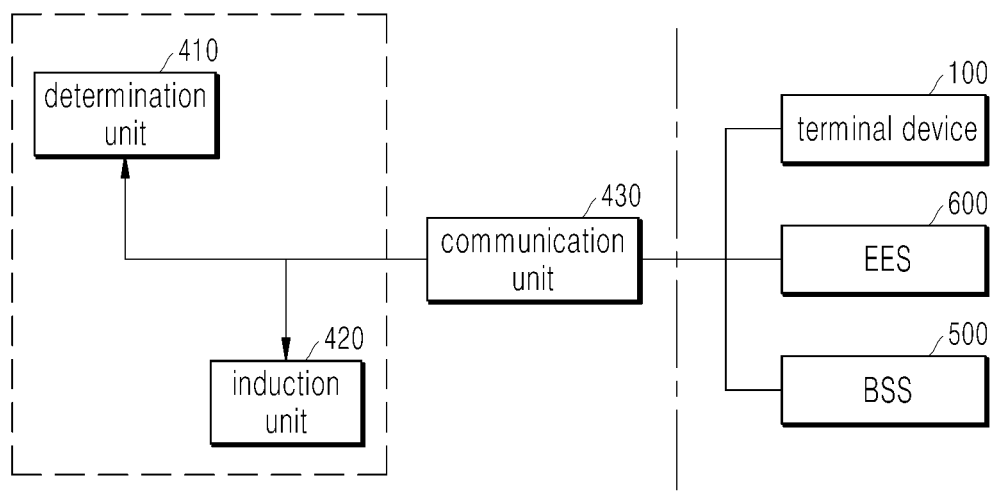
FIG. 2 is a schematic diagram illustrating the configuration of an edge configuration server according to an embodiment of the present disclosure.

As illustrated in FIG. 2, the edge configuration server 400 according to the embodiment of the present disclosure may include a determination unit 410 to determine whether the terminal device 100 reconnects and an induction unit 420 to induce connection of the terminal device 100.

The configuration of the edge configuration server 400 may be entirely or at least partly configured in the form of a hardware module, a software module, or a combination of a hardware module and a software module.

Here, the software module may be understood as an instruction set executed by a processor for operational processing in the edge configuration server 400, and the instruction set may be loaded in a separate memory in the edge configuration server 400.

The edge configuration server 400 according to the embodiment of the present disclosure may have a configuration further including a communication unit 430, which is a communication module in charge of a function of actually communicating with other components in the edge computing service environment, in addition to the foregoing components.

The communication unit 430 may include, for example, but not limited to, an antenna system, an RF transceiver, one or more amplifiers, a tuner, one or more oscillators, a digital signal processor, a codec chipset, and a memory, and may include any circuit to perform these functions.

Through the foregoing configuration, the edge configuration server 400 according to the embodiment of the present disclosure may minimize signaling required for reconnection of the terminal device 100 in an edge computing (multi-access edge computing) service environment in which an edge computing service is available through an edge cloud site (MEC site) closest to a network connection location of the terminal device 100. Hereinafter, each component of the edge configuration server 400 to realize the foregoing will be described in more detail.

The determination unit 410 performs a function of determining whether the terminal device 100 reconnects.

Specifically, the determination unit 410 determines whether the terminal device 100 requested to connect to an edge application through the access network 200 reconnects to the edge application.

The determination unit 410 may identify identification information (e.g., a MDN or an IP) about the terminal device 100 requested to connect to the edge application, and may determine whether the terminal device 100 reconnects according to whether session management information matching the identified identification information (e.g., the MDN or the IP) about the terminal device 100 exists.

Here, in an embodiment of the present disclosure, when the terminal device 100 initially connects to the edge application, the session management information matching the identification information (e.g., the MDN or the IP) about the terminal device 100 may be generated for the terminal device 100, and may be retained (cached) for a set time.

Accordingly, when the connection to the edge application is requested by the terminal device 100, the determination unit 410 may identify whether the session management information matching the identification information (e.g., the MDN or the IP) about the terminal device 100 exists, and may determine that the terminal device 100 reconnects to the edge application when the session management information matching the identification information (e.g., the MDN or the IP) about the terminal device 100 exists as a result of identification.

In this process, when the session management information matching the identification information (e.g., the MDN or the IP) about the terminal device 100 does not exist, the determination unit 410 determines that the terminal device 100 initially connects, and a series of procedures required in an initial connection process of the edge application, such as generation of the session management information, are performed.

The induction unit 420 performs a function of inducing the terminal device 100 to connect to an edge cloud site.

More specifically, when reconnection of the terminal device 100 is determined, the induction unit 420 induces connection to an edge cloud site closest to a network connection location in initial connection of the terminal device 100 according to the session management information cached for the terminal device 100.

The induction unit 420 may transmit connection information about the edge enable server 600 managing the edge application in the edge cloud site closest to the network connection location in the initial connection of the terminal device 100 to the terminal device 100 according to the session management information cached for the terminal device 100, thereby inducing the terminal device 100 to connect to the edge enable server 600.

The session management information about the terminal device 100 includes first connection information, which is connection information previously allocated to the terminal device 100 in the initial connection process, and second connection information, which is connection information about the edge enable server 600 by each service area identified using the first connection information.

The first connection information may be understood as connection information that the edge gateway 300 identifying network connection of the terminal device 100 differently allocates to the terminal device 100 according to a service area in which the edge gateway 300 is deployed, and the second connection information may be understood as connection information about the edge enable server 600 deployed in each edge cloud site in each service area of the edge gateway 300.

Accordingly, when the reconnection of the terminal device 100 is determined, the induction unit 420 may identify the second connection information, which is the connection information about the edge enable server 600 in a specific service area in which the terminal device 100 initially connects, from the session management information cached for the terminal device 100, and may transmit the second connection information to the terminal device 100, thereby inducing the connection to the edge cloud site closest to the network connection location in the initial connection of the terminal device 100.

When the initial connection in which the session management information cached for the terminal device 100 does not exist is determined, the induction unit 420 identifies the first connection information that the edge gateway 300 allocates to the terminal device 100 upon the network connection.

In addition, the induction unit 420 may identify the edge enable server 600 deployed in the specific service area in which the first connection information is allocated according to the information matching the identified first connection information, that is, the edge cloud site closest to the network connection location of the terminal device 100, and may transmit the second connection information about the edge enable server 600 to the terminal device 100.

Here, the terminal device 100 may transmit the first connection information allocated by the edge gateway 300 to the edge configuration server 400 in a provisioning process with the edge configuration server 400 performed in the network connection through the base station, and may receive the second connection information, which is the connection information about the edge enable server 600 identified as being closest to the terminal device 100 from the first connection information, from the edge configuration server 400.

In particular, the induction unit 420 may check subscriber information (e.g., rate plan/additional service subscription status), based on the identification information (e.g., the MDN or the IP) about the terminal device 100 in the provisioning process, and may transmit a response of failure according to unavailability of the edge computing service to the terminal 100 so that the edge computing service is not available when the edge computing service is unavailable to the terminal device 100 as a result of a check.

Here, a case where the edge computing service is unavailable may be understood, for example, as a case the terminal device 100 is an outbound roamer or an user of the terminal device 100 subscribes to a prepaid plan and a low-rate plan as a result of checking the subscriber information.

When receiving the response of failure from the edge configuration server 400, the terminal device 100 may be configured not to attempt connection to the edge application until rebooted.

When the edge computing service is available as a result of checking the subscriber information, the induction unit 420 may determine a service policy for the terminal device 100 in association with the business support system 500.

The service policy may be understood, for example, as information for setting, for example, a high QoS (QCI) priority for the terminal device 100 or applying a non-charging policy for each edge application.

For reference, the business support system 500 involved in determining the service policy is a configuration for a communication service provider (i.e., a communication company) to perform business management for customers, which may manage, for example, subscription, billing, balancing, an order, partnership, and a sales system, and may support various end-to-end communication services along with an operations support system (OSS).

When the second connection information, which is the connection information about the edge enable server 600, is identified for the terminal device 100 having requested the connection to the edge application and the service policy for the terminal device 100 is determined, the induction unit 420 may cache and manage the second connection information and the service policy as the session management information about the terminal device 100 as information for inducing connection when the terminal device 100 reconnects.

Accordingly, in an embodiment of the present disclosure, the terminal device 100 reconnecting to the edge application may be induced to connect to the edge cloud site closest to the network connection location in the initial connection of the terminal device 100 according to the second connection information in the session management information, and the same service policy as that in the initial connection may be applied to the terminal device 100 according to the service policy in the session management information.

Next, the configuration of the edge enable server 600 according to an embodiment of the present disclosure is described hereinafter with reference to FIG. 3.

Figure 3:
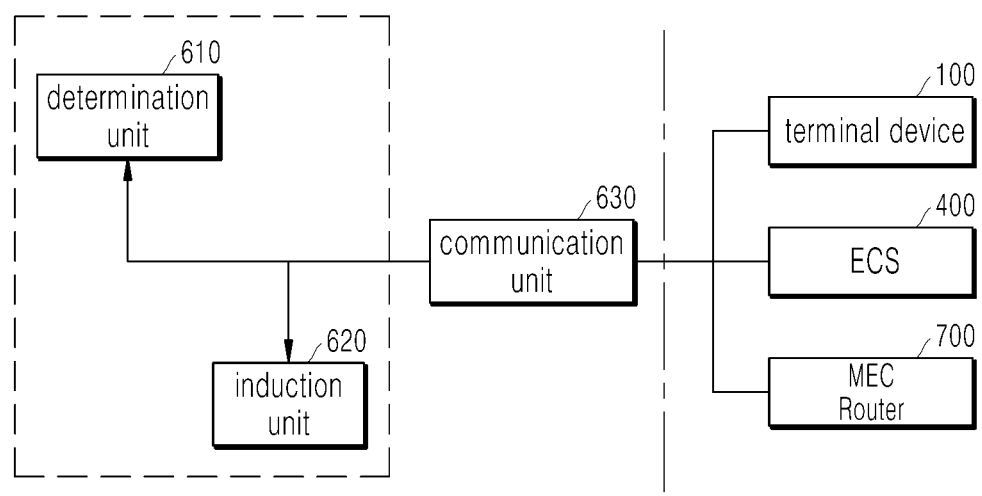
FIG. 3 is a schematic diagram illustrating the configuration of an edge enable server according to an embodiment of the present disclosure.

As illustrated in FIG. 3, the edge enable server 600 according to the embodiment of the present disclosure may include a determination unit 610 to determine whether the terminal device 100 reconnects and a support unit 620 to support edge communication of the terminal device 100.

The configuration of the edge enable server 600 may be entirely or at least partly configured in the form of a hardware module, a software module, or a combination of a hardware module and a software module.

Here, the software module may be understood as an instruction set executed by a processor for operational processing in the edge enable server 600, and the instruction set may be loaded in a separate memory in the edge enable server 600.

The edge enable server 600 according to the embodiment of the present disclosure may have a configuration further including a communication unit 630, which is a communication module in charge of a function of actually communicating with other components in the edge computing service environment, in addition to the foregoing components.

The communication unit 630 may include, for example, but not limited to, an antenna system, an RF transceiver, one or more amplifiers, a tuner, one or more oscillators, a digital signal processor, a codec chipset, and a memory, and may include any circuit to perform these functions.

Through the foregoing configuration, the edge enable server 600 according to the embodiment of the present disclosure may minimize signaling required for reconnection of the terminal device 100 in an edge computing (multi-access edge computing) service environment in which an edge computing service is available through an edge cloud site (MEC site) closest to a network connection location of the terminal device 100. Hereinafter, each component of the edge enable server 600 to realize the foregoing will be described in more detail.

The determination unit 610 performs a function of determining whether the terminal device 100 reconnects.

Specifically, the determination unit 610 determines whether the terminal device 100 induced to connect to the edge cloud site reconnects to the edge application.

The determination unit 610 may identify identification information (e.g., a MDN or an IP) about the terminal device 100 requested to connect to the edge application, and may determine whether the terminal device 100 reconnects according to whether session management information matching the identified identification information (e.g., the MDN or the IP) about the terminal device 100 exists.

Here, in an embodiment of the present disclosure, when the terminal device 100 initially connects to the edge application, the session management information matching the identification information (e.g., the MDN or the IP) about the terminal device 100 may be generated for the terminal device 100, and may be retained (cached) for a set time.

Accordingly, the determination unit 610 may identify whether the session management information matching the identification information (e.g., the MDN or the IP) about the terminal device 100 induced to connect to the edge cloud site exists, and may determine that the terminal device 100 reconnects to the edge application when the session management information matching the identification information (e.g., the MDN or the IP) about the terminal device 100 exists as a result of identification.

The support unit 620 performs a function of supporting edge communication for the terminal device 100.

More specifically, when reconnection of the terminal device 100 is determined, the support unit 620 supports edge communication between at least one of applications managed in the edge cloud site and the terminal device according to the session management information cached for the terminal device 100.

The support unit 620 may transmit a list of edge applications previously generated for the terminal device 100 in an initial connection process of the terminal device 100 to the terminal device 100, thereby supporting edge communication between an edge application in the list and the terminal device 100.

The session management information about the terminal device 100 may include a list of at least one edge application identified to match an edge enable client (EEC) installed in the terminal device 100 in the initial connection process of the terminal device 100 among the edge applications managed in the edge cloud site.

Accordingly, when the reconnection of the terminal device 100 is determined, the support unit 620 may extract the list of edge applications identified in the initial connection process of the terminal device 100 from the session management information cached for the terminal device 100, and may transmit the list of edge applications to the terminal device 100, thereby supporting the edge communication between the terminal device 100 and the edge application.

When initial connection in which the session management information cached for the terminal device 100 does not exist is determined, the support unit 620 caches and manages a list of edge applications identified to match an edge enable client (EEC) installed in the terminal device 100 among the edge applications managed in the edge cloud site as session management information.

To this end, when determining the initial connection of the terminal device 100, the support unit 620 may generate a list of all edge applications managed in an edge cloud site, and may transmit the generated list to the terminal device 100, thereby processing edge communication with at least one edge application matching the edge enable client installed in the terminal device 100 among the edge applications in the list.

The list may include a package name (App PKG name) and a domain name (fully qualified domain name: FQDN) of each edge application and connection information (hereinafter, third connection information) about the edge application matching each domain name (FQDN).

When obtaining the list of all edge applications existing in the edge cloud site, the terminal device 100 may identify whether there is an edge application matching the edge enable client installed in the terminal device 100, and may process edge communication with at least one matching edge application when there is the matching edge application as a result of identification.

Here, whether there is an edge application matching the edge enable client installed in the terminal device 100 may be determined by identifying a package name (App PKG name) of the application integrally managed by the edge enable client from the list.

Before processing the edge communication, the terminal device 100 may convert a domain name (FQDN) of the edge application into third connection information that is connection information about the edge application in the edge communication with the edge application identified by the package nick name (App PKG name), thereby processing the edge communication with the edge application existing in the edge cloud site.

The foregoing process according to the initial connection of the terminal device 100 may be performed in a register message-based terminal registration process performed for the terminal device 100 connected to the edge enable server 600. However, when there is no edge application matching the edge enable client previously installed in the terminal device 100 in the list, the register message-based terminal registration process for the terminal device 100 may be suspended.

The suspended terminal registration process may be resumed at a time when a new edge enable client is installed in the terminal device 100 or in each set period.

The support unit 620 may manage the state of the at least one edge application matching the edge enable client (EEC) installed in the terminal device 100 by period, thereby identifying error information (defective state) about the edge application.

When the error information about the edge application is identified, the support unit 620 may transmit the identified error information to the edge configuration server 400 that induces connection of the terminal device 100, thus enabling the edge configuration server 400 to induce connection of the terminal device 100 to an edge cloud site other than the edge cloud site in which the error information is identified.

For reference, in an embodiment of the present disclosure, an embodiment of caching the third connection information, which is the connection information about the edge application of which the edge communication with the terminal device 100 is processed, as session management information in the initial connection process of the terminal device 100 may be further taken into consideration.

In this case, when the reconnection to the edge application is requested due to disconnection or change of the access network 200, the terminal device 100 may be configured to directly identify the third connection information, which is the connection information about the edge application of which the edge communication is processed, from the session management information and to resume the edge communication with the edge application, based on the third connection information.

As described above, according to the configurations of the edge configuration server 400 and the edge enable server 600 according to the embodiments of the present disclosure, it is possible to use a service through the edge cloud site (MEC site) closest to the network connection location of the terminal device 100 in the edge computing (multi-access edge computing: MEC) service environment, and to cache and manage the session management information about the terminal device 100 in this process to thereby simplify signaling required in a reconnection process of the terminal device 100, based on the information in the session management information, thus reducing signaling processing loads and ensuring optimal service performance.

Figure 4:
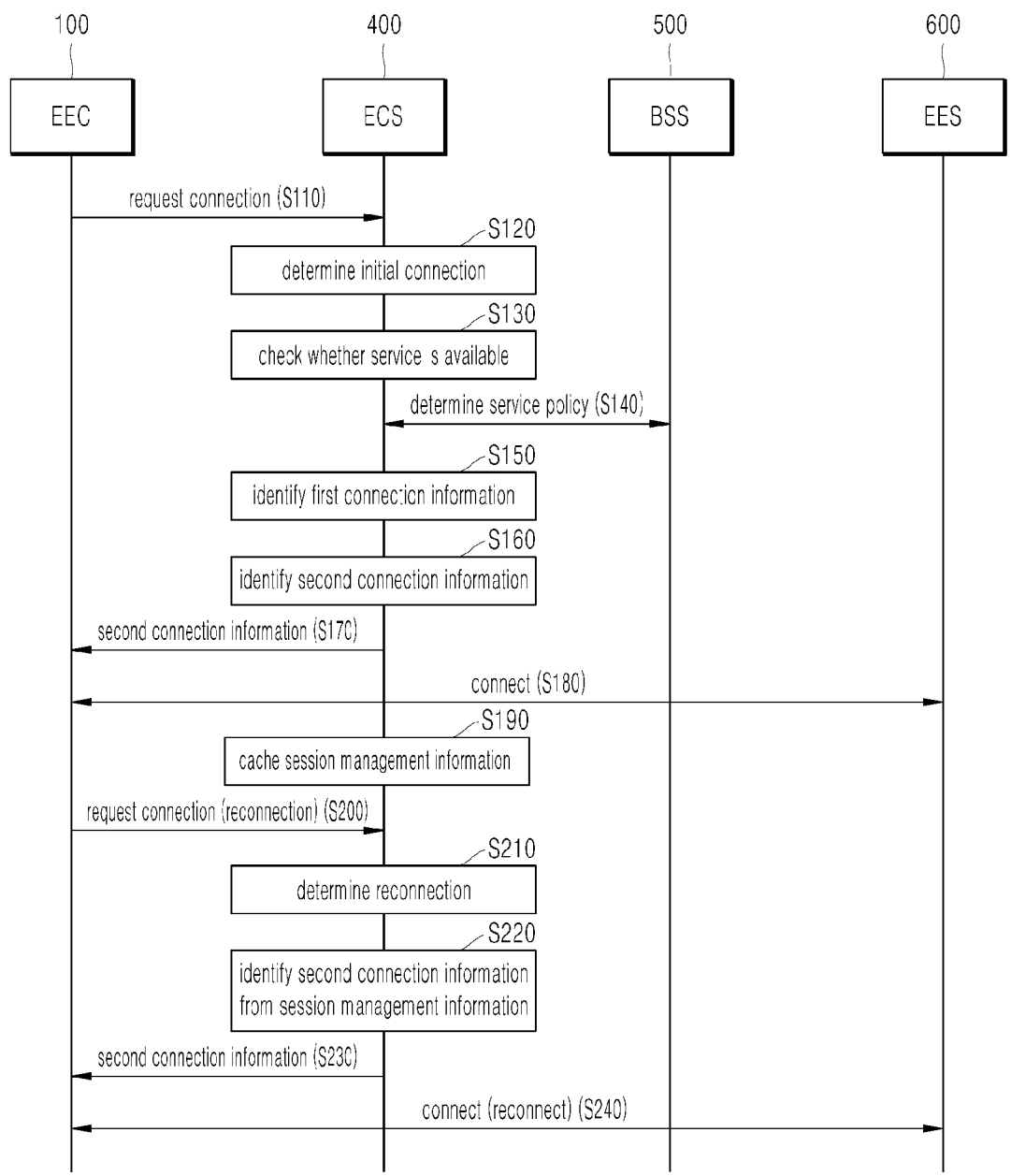
FIG. 4 is a flowchart illustrating an operating method of each component inducing access to an edge cloud site in an edge computing service environment according to an embodiment of the disclosure.

Hereinafter, an operating method of each component for inducing connection to an edge cloud site in an edge computing service environment according to an embodiment of the present disclosure will be described with reference to FIG. 4.

First, the edge configuration server 400 determines that the terminal device 100 requested to connect to an edge application through the access network 200 initially connects to the edge application (S110 and S120).

The edge configuration server 400 may identify identification information (e.g., a MDN or an IP) about the terminal device 100 requested to connect to the edge application, and may determine whether the terminal device 100 reconnects according to whether session management information matching the identified identification information (e.g., the MDN or the IP) about the terminal device 100 exists.

Here, in an embodiment of the present disclosure, when the terminal device 100 initially connects to the edge application, the session management information matching the identification information (e.g., the MDN or the IP) about the terminal device 100 may be generated for the terminal device 100, and may be retained (cached) for a set time.

Accordingly, when the connection to the edge application is requested by the terminal device 100, the determination unit 410 may identify whether the session management information matching the identification information (e.g., the MDN or the IP) about the terminal device 100 exists, and may determine that the terminal device 100 initially connects to the edge application when there is no session management information matching the identification information (e.g., the MDN or the IP) about the terminal device 100 exists as a result of identification.

When determining that the terminal device 100 initially connects, the edge configuration server 400 checks subscriber information (e.g., rate plan/additional service subscription status), based on the identification information (e.g., the MDN or the IP) about the terminal device 100, and determines a service policy for the terminal device 100 in association with the business support system 500 when an edge computing service is available as a result of a check (S130 and S140).

The service policy may be understood, for example, as information for setting, for example, a high QoS (QCI) priority for the terminal device 100 or applying a non-charging policy for each edge application.

When the edge computing service is unavailable to the terminal 100 as a result of checking the subscriber information, based on the identification information (e.g., the MDN or the IP) about the terminal device 100, the edge configuration server 400 may transmit a response of failure according to unavailability of the edge computing service to the terminal 100 so that the edge computing service is not available.

Here, a case where the edge computing service is unavailable may be understood, for example, as a case that the terminal device 100 is an outbound roamer or an user of the terminal device 100 subscribes to a prepaid plan and a low-rate plan as a result of checking the subscriber information.

When receiving the response of failure from the edge configuration server 400, the terminal device 100 may be configured not to attempt connection to the edge application until rebooted.

The edge configuration server 400 identifies first connection information, which is connection information that the edge gateway 300 allocates to the terminal device 100 upon network connection (S150).

The first connection information may be understood as connection information that the edge gateway 300 identifying the network connection of the terminal device 100 differently allocates to the terminal device 100 according to a service area in which the edge gateway 300 is deployed.

The edge configuration server 400 may identify the edge enable server 600 deployed in a specific service area in which the first connection information is allocated according to information matching the identified first connection information, and may transmit second connection information about the identified edge enable server 600 to the terminal device 100, thus inducing the terminal device 100 to connect to the edge enable server 600 according to the second connection information (S160 to S180).

The second connection information is connection information by each service area identified using the first connection information, and may be understood as connection information about the edge enable server 600 deployed in each edge cloud site in each service area of the edge gateway 300.

When the second connection information, which is the connection information about the edge enable server 600, is identified for the terminal device 100 having requested the connection to the edge application and the service policy for the terminal device 100 is determined, the edge configuration server 400 caches and manages the second connection information and the service policy as the session management information for inducing connection when the terminal device 100 reconnects (S190).

The edge configuration server 400 determines reconnection to the edge application with respect to a request for connection of the terminal device 100 to the edge application through the access network (S200 and S210).

Here, the edge configuration server 400 may identify the identification information (e.g., the MDN or the IP) about the terminal device 100 requested to connect to the edge application, and may determine that the terminal device 100 reconnects when there is the session information matching the identified identification information (e.g., the MDN or the IP) about the terminal device 100.

Reconnection of the terminal device 100 to the edge application may be requested for a reason, such as a communication network connection change in an edge application connection location.

Subsequently, when the reconnection of the terminal device 100 is determined, the edge configuration server 400 induces connection to an edge cloud site closest to a network connection location in initial connection of the terminal device 100, based on the session management information cached for the terminal device 100 (S220 to S240).

The edge configuration server 400 may transmit the connection information about the edge enable server 600 managing the edge application in the edge cloud site closest to the network connection location in the initial connection of the terminal device 100 to the terminal device 100 according to the session management information cached for the terminal device 100, thereby inducing the terminal device 100 to connect to the edge enable server 600.

The session management information about the terminal device 100 may include the first connection information, which is the connection information previously allocated to the terminal device 100 in the initial connection process, and the second connection information, which is the connection information about the edge enable server 600 by each service area identified using the first connection information.

Accordingly, when the reconnection of the terminal device 100 is determined, the edge configuration server 400 may identify the second connection information, which is the connection information about the edge enable server 600 in a specific service area in which the terminal device 100 initially connects, from the session management information cached for the terminal device 100, and may transmit the second connection information to the terminal device 100, thereby inducing the connection to the edge cloud site closest to the network connection location in the initial connection of the terminal device 100.

Figure 5:
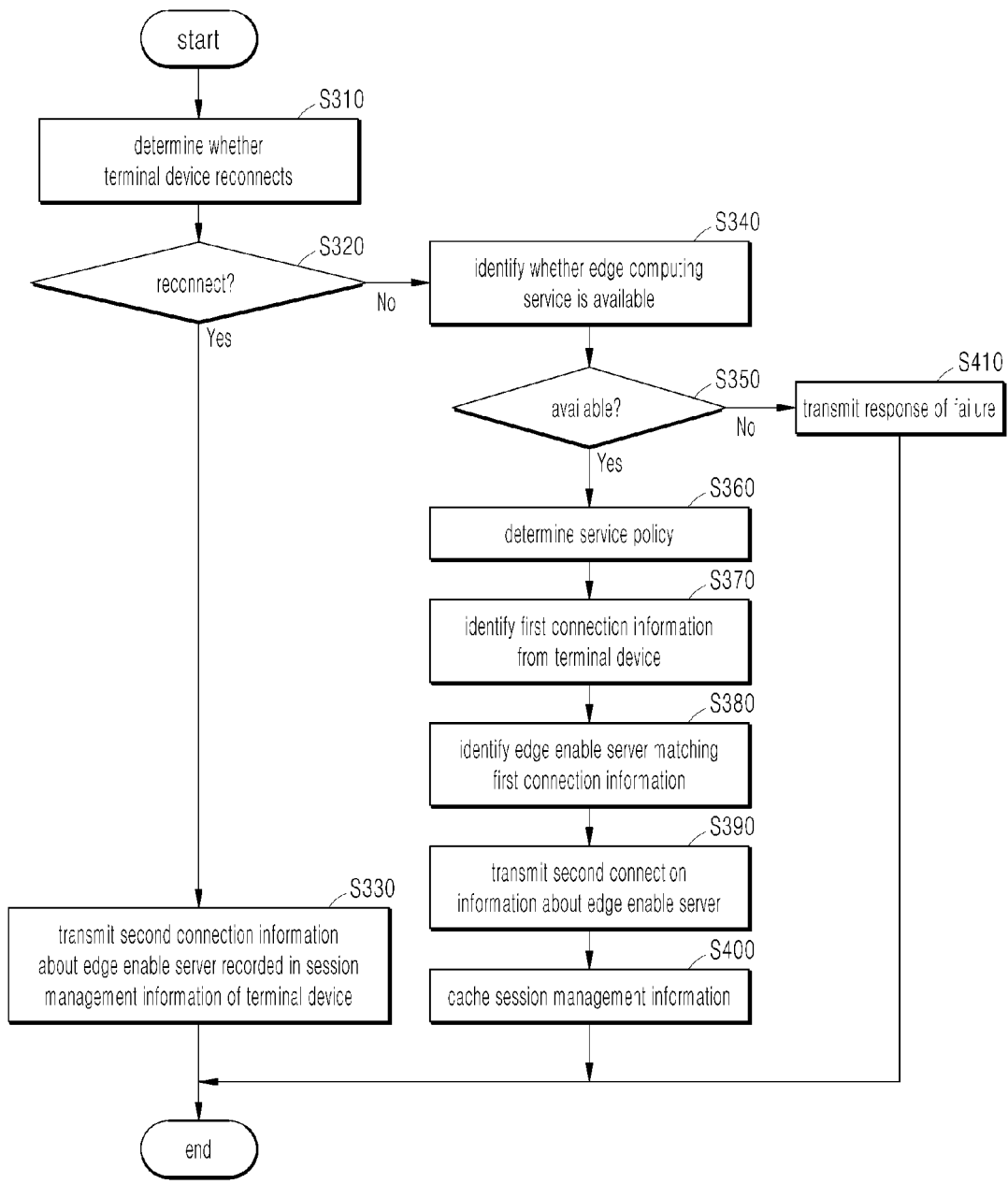
FIG. 5 is a flowchart illustrating an operating method of an edge configuration server according to an embodiment of the present disclosure.

Hereinafter, an operating method of the edge configuration server 400 according to an embodiment of the present disclosure will be described with reference to FIG. 5.

First, the determination unit 410 determines whether the terminal device 100 requested to connect to an edge application through the access network 200 reconnects to the edge application (S310).

The determination unit 410 may identify identification information (e.g., a MDN or an IP) about the terminal device 100 requested to connect to the edge application, and may determine whether the terminal device 100 reconnects according to whether session management information matching the identified identification information (e.g., the MDN or the IP) about the terminal device 100 exists.

Here, in an embodiment of the present disclosure, when the terminal device 100 initially connects to the edge application, the session management information matching the identification information (e.g., the MDN or the IP) about the terminal device 100 may be generated for the terminal device 100, and may be retained (cached) for a set time.

Accordingly, when the connection to the edge application is requested by the terminal device 100, the determination unit 410 may identify whether the session management information matching the identification information (e.g., the MDN or the IP) about the terminal device 100 exists, and may determine that the terminal device 100 reconnects to the edge application when the session management information matching the identification information (e.g., the MDN or the IP) about the terminal device 100 exists as a result of identification.

In this process, when the session management information matching the identification information (e.g., the MDN or the IP) about the terminal device 100 does not exist, the determination unit 410 determines that the terminal device 100 initially connects, and a series of procedures required in an initial connection process of the edge application, such as generation of the session management information, are performed.

When reconnection of the terminal device 100 is determined, the induction unit 420 induces connection to an edge cloud site closest to a network connection location in initial connection of the terminal device 100 according to the session management information cached for the terminal device 100 (S320 and S330).

The induction unit 420 may transmit connection information about the edge enable server 600 managing the edge application in the edge cloud site closest to the network connection location in the initial connection of the terminal device 100 to the terminal device 100 according to the session management information cached for the terminal device 100, thereby inducing the terminal device 100 to connect to the edge enable server 600.

The session management information about the terminal device 100 includes first connection information, which is connection information previously allocated to the terminal device 100 in the initial connection process, and second connection information, which is connection information about the edge enable server 600 by each service area identified using the first connection information.

The first connection information may be understood as connection information that the edge gateway 300 identifying network connection of the terminal device 100 differently allocates to the terminal device 100 according to a service area in which the edge gateway 300 is deployed, and the second connection information may be understood as connection information about the edge enable server 600 deployed in each edge cloud site in each service area of the edge gateway 300.

Accordingly, when the reconnection of the terminal device 100 is determined, the induction unit 420 may identify the second connection information, which is the connection information about the edge enable server 600 in a specific service area in which the terminal device 100 initially connects, from the session management information cached for the terminal device 100, and may transmit the second connection information to the terminal device 100, thereby inducing the connection to the edge cloud site closest to the network connection location in the initial connection of the terminal device 100.

When the initial connection in which the session management information cached for the terminal device 100 does not exist is determined in operation S320, the induction unit 420 checks subscriber information (e.g., rate plan/ additional service subscription status), based on the identification information (e.g., the MDN or the IP) about the terminal device 100 (S340).

When an edge computing service is available as a result of checking the subscriber information, the induction unit 420 determines a service policy for the terminal device 100 in association with the business support system 500 (S350 and S360).

The service policy may be understood, for example, as information for setting, for example, a high QoS (QCI) priority for the terminal device 100 or applying a non-charging policy for each edge application.

For reference, the business support system 500 involved in determining the service policy is a configuration for a communication service provider (i.e., a communication company) to perform business management for customers, which may manage, for example, subscription, billing, balancing, an order, partnership, and a sales system, and may support various end-to-end communication services along with an operations support system (OSS).

When the service policy for the terminal device is determined, the induction unit 420 identifies the first connection information, which is the connection information that the edge gateway 300 allocates to the terminal device 100 upon network connection (S370).

The first connection information may be understood as connection information that the edge gateway 300 identifying the network connection of the terminal device 100 differently allocates to the terminal device 100 according to a service area in which the edge gateway 300 is deployed.

The induction unit 420 identifies the edge enable server 600 deployed in the specific service area in which the first connection information is allocated according to information matching the identified first connection information, that is, the edge cloud site closest to the network connection location of the terminal device 100, and transmits the second connection information about the edge enable server 600 to the terminal device 100 (S380 and S390).

The second connection information is connection information by each service area identified using the first connection information, and may be understood as connection information about the edge enable server 600 deployed in each edge cloud site in each service area of the edge gateway 300.

When the service policy for the terminal device 100 having requested the connection to the edge application is determined and the second connection information, which is the connection information about the edge enable server 600, is identified, the induction unit 420 caches and manages the service policy and the second connection information as the session management information about the terminal device 100 as information for inducing connection when the terminal device 100 reconnects (S400).

Accordingly, in an embodiment of the present disclosure, the terminal device 100 reconnecting to the edge application may be induced to connect to the edge cloud site closest to the network connection location in the initial connection of the terminal device 100 according to the second connection information in the session management information, and the same service policy as that in the initial connection may be applied to the terminal device 100 according to the service policy in the session management information.

When the edge computing service is determined to be unavailable to the terminal device 100 in operation S350, the induction unit 420 transmits a response of failure according to unavailability of the edge computing service to the terminal 100 so that the edge computing service is not available (S410).

Here, a case where the edge computing service is unavailable may be understood, for example, as a case that the terminal device 100 is an outbound roamer or a user of the terminal device 100 subscribes to a prepaid plan and a low-rate plan as a result of checking the subscriber information.

Figure 6:
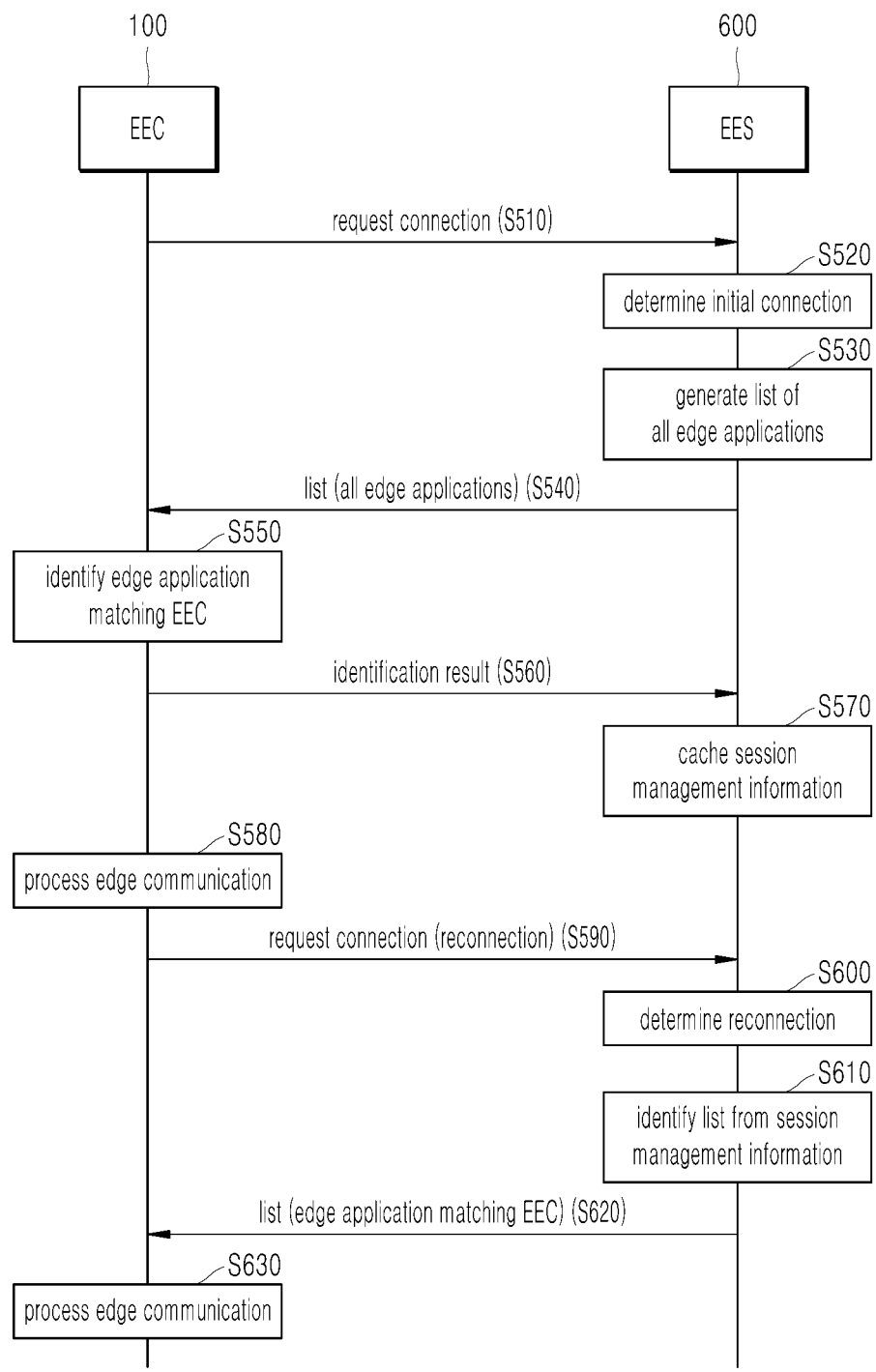
FIG. 6 is a flowchart illustrating an operating method of each component supporting edge communication in an edge computing service environment according to an embodiment of the disclosure.

Hereinafter, an operating method of each component for supporting edge communication in an edge computing service environment according to an embodiment of the present disclosure will be described with reference to FIG. 6.

First, the edge enable server 600 determines that the terminal device 100 induced to connect to an edge cloud site initially connects to an edge application (S510 and S520).

The edge enable server 600 may identify identification information (e.g., a MDN or an IP) about the terminal device 100 requested to connect to the edge application, and may determine whether the terminal device 100 reconnects according to whether session management information matching the identified identification information (e.g., the MDN or the IP) about the terminal device 100 exists.

Here, in an embodiment of the present disclosure, when the terminal device 100 initially connects to the edge application, the session management information matching the identification information (e.g., the MDN or the IP) about the terminal device 100 may be generated for the terminal device 100, and may be retained (cached) for a set time.

Accordingly, the edge enable server 600 may identify whether the session management information matching the identification information (e.g., the MDN or the IP) about the terminal device 100 induced to connect to the edge cloud site exists, and may determine that the terminal device 100 initially connects to the edge application when there is no session management information matching the identification information (e.g., the MDN or the IP) about the terminal device 100 as a result of identification.

When initial connection in which the session management information cached for the terminal device 100 does not exist is determined, the edge enable server 600 generates a list of all edge applications managed in an edge cloud site, and transmits the generated list to the terminal 100 (S530 and S540).

The list may include a package name (App PKG name) and a domain name (fully qualified domain name: FQDN) of each edge application and connection information (hereinafter, third connection information) about the edge application matching each domain name (FQDN).

When obtaining the list of all edge applications existing in the edge cloud site, the terminal device 100 identifies whether there is an edge application matching the edge enable client installed in the terminal device 100 (S550).

Here, whether there is an edge application matching the edge enable client installed in the terminal device 100 may be identified by identifying a package name (App PKG name) of the application integrally managed by the edge enable client from the list.

The edge enable server 600 identifies, from the terminal device 100, a list of edge applications identified to match the edge enable client (EEC) installed in the terminal device 100 among the edge applications managed in the edge cloud site, and caches and manages the list as session management information for the terminal device 100 (S560 and S570).

When at least one edge application matching the edge enable client installed in the terminal device 100 is identified as being in the list, the terminal device 100 processes edge communication with the edge application (S580).

Here, the terminal device 100 may convert a domain name (FQDN) of the edge application into third connection information that is connection information about the edge application in the edge communication with the edge application identified by the package nick name (App PKG name), thereby processing the edge communication with the edge application existing in the edge cloud site.

The foregoing process according to the initial connection of the terminal device 100 may be performed in a register message-based terminal registration process performed for the terminal device 100 connected to the edge enable server 600. However, when there is no edge application matching the edge enable client previously installed in the terminal device 100 in the list, the register message-based terminal registration process for the terminal device 100 may be suspended.

The suspended terminal registration process may be resumed at a time when a new edge enable client is installed in the terminal device 100 or in each set period.

The edge enable server 600 determines that the terminal device 100 induced to connect to the edge cloud site reconnects to the edge application (S590 and S600).

Here, the edge enable server 600 may identify the identification information (e.g., the MDN or the IP) about the terminal device 100 requested to connect to the edge application, and may determine that the terminal device 100 reconnects when there is the session information matching the identified identification information (e.g., the MDN or the IP) about the terminal device 100.

Reconnection of the terminal device 100 to the edge application may be requested for a reason, such as a communication network connection change in an edge application connection location.

Subsequently, when the reconnection of the terminal device 100 is determined, the edge enable server 600 supports edge communication between the at least one of the edge applications managed in the edge cloud site and the terminal device 100 according to the session management information cached for the terminal device 100 (S610 to S630).

Here, the edge enable server 600 may transmit a list of edge applications previously generated for the terminal device 100 in an initial connection process of the terminal device 100 to the terminal device 100, thereby supporting edge communication between an edge application in the list and the terminal device 100.

The session management information about the terminal device 100 may include a list of at least one edge application identified to match the edge enable client (EEC) installed in the terminal device 100 in the initial connection process of the terminal device 100 among the edge applications managed in the edge cloud site.

Accordingly, when the reconnection of the terminal device 100 is determined, the edge enable server 600 may extract the list of edge applications identified in the initial connection process of the terminal device 100 from the session management information cached for the terminal device 100, and may transmit the list of edge applications to the terminal device 100, thereby supporting the edge communication between the terminal device 100 and the edge application.

Figure 7:
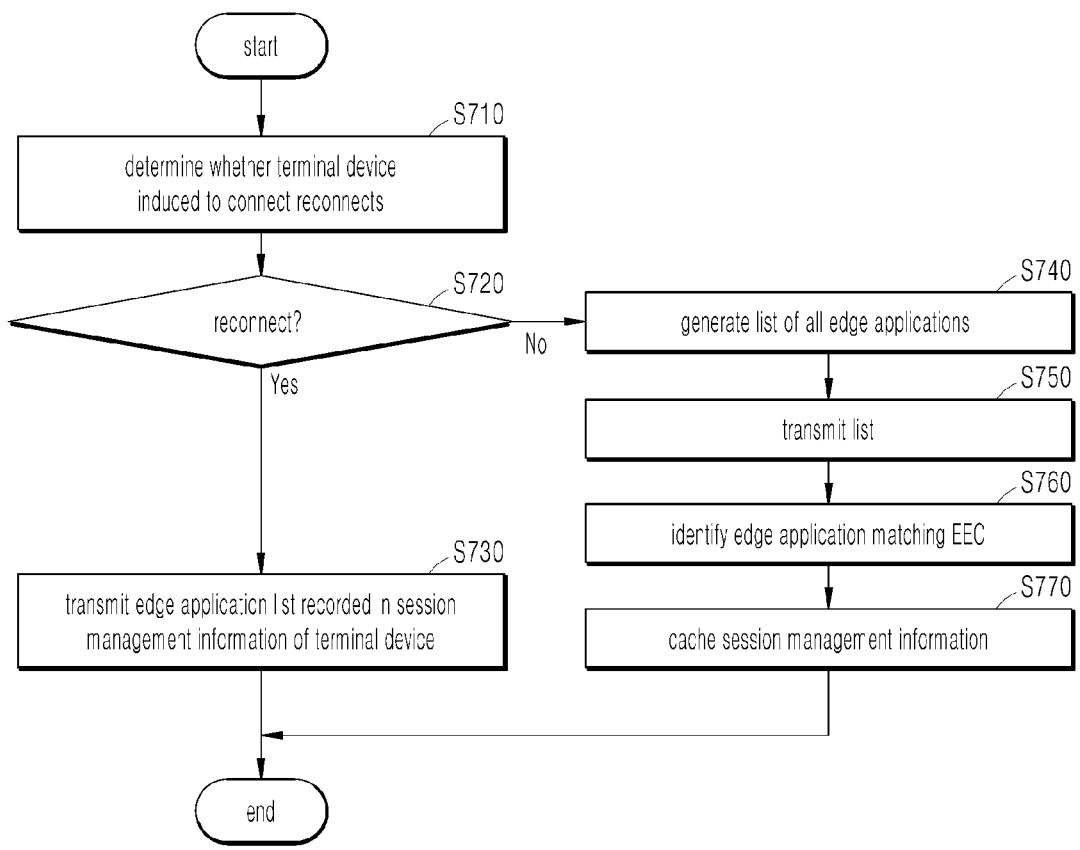
FIG. 7 is a schematic flowchart illustrating an operating method of an edge enable server according to an embodiment of the present disclosure.

Hereinafter, an operating method of the edge enable server 600 according to an embodiment of the present disclosure will be described with reference to FIG. 7.

First, the determination unit 610 determines whether the terminal device 100 induced to connect to the edge cloud site reconnects to the edge application (S710).

The determination unit 610 may identify identification information (e.g., a MDN or an IP) about the terminal device 100 requested to connect to the edge application, and may determine whether the terminal device 100 reconnects according to whether session management information matching the identified identification information (e.g., the MDN or the IP) about the terminal device 100 exists.

Here, in an embodiment of the present disclosure, when the terminal device 100 initially connects to the edge application, the session management information matching the identification information (e.g., the MDN or the IP) about the terminal device 100 may be generated for the terminal device 100, and may be retained (cached) for a set time.

Accordingly, the determination unit 610 may identify whether the session management information matching the identification information (e.g., the MDN or the IP) about the terminal device 100 induced to connect to the edge cloud site exists, and may determine that the terminal device 100 reconnects to the edge application when the session management information matching the identification information (e.g., the MDN or the IP) about the terminal device 100 exists as a result of identification.

When reconnection of the terminal device 100 is determined, the support unit 620 supports edge communication between at least one of applications managed in the edge cloud site and the terminal device according to the session management information cached for the terminal device 100 (S720 and S730).

The support unit 620 may transmit a list of edge applications previously generated for the terminal device 100 in an initial connection process of the terminal device 100 to the terminal device 100, thereby supporting edge communication between an edge application in the list and the terminal device 100.

The session management information about the terminal device 100 may include a list of at least one edge application identified to match an edge enable client (EEC) installed in the terminal device 100 in the initial connection process of the terminal device 100 among the edge applications managed in the edge cloud site.

Accordingly, when the reconnection of the terminal device 100 is determined, the support unit 620 may extract the list of edge applications identified in the initial connection process of the terminal device 100 from the session management information cached for the terminal device 100, and may transmit the list of edge applications to the terminal device 100, thereby supporting the edge communication between the terminal device 100 and the edge application.

When initial connection in which the session management information cached for the terminal device 100 does not exist is determined in operation S720, the support unit 620 generates a list of all edge applications managed in an edge cloud site, and transmits the generated list to the terminal device 100, thereby processing edge communication with at least one edge application matching the edge enable client installed in the terminal device 100 among the edge applications in the list (S740 and S750).

When obtaining the list of all edge applications existing in the edge cloud site, the terminal device 100 may identify whether there is an edge application matching the edge enable client installed in the terminal device 100, and may process edge communication with at least one matching edge application when there is the matching edge application as a result of identification.

Here, whether there is an edge application matching the edge enable client installed in the terminal device 100 may be identified by identifying a package name (App PKG name) of the application integrally managed by the edge enable client from the list.

Before processing the edge communication, the terminal device 100 may convert a domain name (FQDN) of the edge application into third connection information that is connection information about the edge application in the edge communication with the edge application identified by the package nick name (App PKG name), thereby processing the edge communication with the edge application existing the edge cloud site.

The foregoing process according to the initial connection of the terminal device 100 may be performed in a register message-based terminal registration process performed for the terminal device 100 connected to the edge enable server 600. However, when there is no edge application matching the edge enable client previously installed in the terminal device 100 in the list, the register message-based terminal registration process for the terminal device 100 may be suspended.

The suspended terminal registration process may be resumed at a time when a new edge enable client is installed in the terminal device 100 or in each set period.

The support unit 620 may manage the state of the at least one edge application matching the edge enable client (EEC) installed in the terminal device 100 by period, thereby identifying error information (defective state) about the edge application.

When the error information about the edge application is identified, the support unit 620 may transmit the identified error information to the edge configuration server 400 that induces connection of the terminal device 100, thus enabling the edge configuration server 400 to induce connection of the terminal device 100 to an edge cloud site other than the edge cloud site in which the error information is identified.

Subsequently, the edge enable server 600 identifies, from the terminal device 100, a list of edge applications identified to match the edge enable client (EEC) installed in the terminal device 100 among the edge applications managed in the edge cloud site, and caches and manages the list as session management information for the terminal device 100 (S760 and S770).

As described above, according to an operating method of each component in an edge computing service environment according to the embodiment of the present disclosure, it is possible to use a service through the edge cloud site (MEC site) closest to the network connection location of the terminal device 100 in the edge computing (multi-access edge computing: MEC) service environment, and to cache and manage the session management information about the terminal device 100 in this process to thereby simplify signaling required in a reconnection process of the terminal device 100, based on the information in the session management information, thus reducing signaling processing loads and ensuring optimal service performance.

The operating methods according to the embodiments of the present disclosure may be configured in the form of program instructions that can be executed through various computer devices and may be recorded in a computer-readable medium. The computer-readable medium may include a program instruction, a data file, a data structure, and the like alone or in combination. The program instruction recorded in the medium may be specially designed and configured for the present disclosure, or may be known and available to those skilled in computer software. Examples of the computer-readable recording medium include magnetic media, such as a hard disk, a floppy disk, and a magnetic tape, optical media, such as a CD-ROM and a DVD, magneto-optical media, such as a floptical disk, and a hardware device specially configured to store and perform a program instruction, such as a ROM, a RAM, and a flash memory. Examples of the program instruction include not only a machine code made by a compiler but also a high-level language code executable by a computer using an interpreter. The hardware device may be configured to operate as one or more software modules to perform an operation of the present disclosure, and vice versa.

Although the present disclosure has been described in detail with reference to the exemplary embodiments, the present disclosure is not limited to these embodiments, and various changes and modifications may be made by those skilled in the art to which the present disclosure belongs without departing from the gist of the present disclosure claimed in the following claims.

The invention claimed is:

1. An edge configuration server comprising:
a determination unit configured to determine that a terminal device requesting to connect to an edge application is to reconnect to the edge application according to session management information cached for the terminal device; and
an induction unit configured to:
in response to the determination unit determines that the terminal device is to reconnect to the edge application, transmit connection information to the terminal device to induce connection of the terminal device to an edge enable server (EES) managing the edge application in an edge cloud site closest to a network connection location in an initial connection of the terminal device to the edge application.

2. The edge configuration server of claim 1, wherein the session management information is identified from first connection information, which is connection information allocated to the terminal device in the initial connection of the terminal device to the edge application, and
the session management information comprises second connection information, which is connection information about the edge enable server to which the terminal device connects in the initial connection of the terminal device to the edge application.

3. The edge configuration server of claim 2, wherein the first connection information comprises connection information that an edge gateway (MEC-GW) identifying network connection of the terminal device differently allocates to the terminal device according to a service area in which the edge gateway is deployed, and
the second connection information comprises connection information about an edge enable server deployed in each edge cloud site in each service area of the edge gateway.

4. The edge configuration server of claim 2, wherein the induction unit transmits, to the terminal device, the second connection information in the session management information cached for the terminal device to induce the terminal device to connect to the edge enable server according to the second connection information, when the terminal device is determined to reconnect to the edge application.

5. The edge configuration server of claim 2, wherein the determination unit determines that the terminal device is to initially connect to the edge application when there is no session management information cached for the terminal device, and
the induction unit identifies a specific service area in which an edge gateway (MEC-GW) identifying network connection of the terminal device is deployed from the first connection information that the edge gateway allocates to the terminal device, transmits the second connection information, which is the connection information about the edge enable server deployed in the specific service area, to the terminal device, and caches the session management information comprising the second connection information for the terminal device when the initial connection of the terminal device is determined.

6. The edge configuration server of claim 2, wherein the session management information further comprises a service policy determined for the terminal device in association with a business support system (BSS) according to subscription information about the terminal device.

7. An edge enable server comprising:
a determination unit configured to determine that a terminal device induced to connect to an edge cloud site closest to a network connection location in an initial connection of the terminal device to an edge application is to reconnect to the edge application; and
a support unit configured to support edge communication between at least one of edge applications managed in the edge cloud site and the terminal device by transmitting, to the terminal device, a list of the edge applications in session management information cached for the terminal device, when the terminal device is determined to reconnect to the edge application.

8. The edge enable server of claim 7, wherein the session management information comprises the list of the edge applications generated for the terminal device in the initial connection of the terminal device to the edge application, and
the list comprises at least one edge application matching an edge enable client (EEC) installed in the terminal device of the edge applications managed in the edge cloud site.

9. The edge enable server of claim 8, wherein the determination unit determines that the terminal device is to initially connect to the edge application when there is no session management information cached for the terminal device, and
the support unit generates a list of all edge applications managed in the edge cloud site to transmit the list to the terminal device, and caches the session management information comprising a list of at least one edge application identified to match the edge enable client (EEC) in the list of all edge applications upon identifying the at least one edge application from the terminal device, when initial connection of the terminal device is determined.

10. The edge enable server of claim 7, wherein, when error information is identified from periodic state management of at least one edge application matching an edge enable client (EEC) installed in the terminal device, the support unit transmits the error information to an edge configuration server (ECS) that induces connection of the terminal device to enable the edge configuration server to induce connection of the terminal device to an edge cloud site other than the edge cloud site according to the error information.

11. An operating method of an edge configuration server, the method comprising:
determining that a terminal device requesting to connect to an edge application is to reconnect to the edge application according to session management information cached for the terminal device; and
in response to the determination that the terminal device is to reconnect to the edge application, transmitting connection information to the terminal device to induce the terminal device to connect to an edge enable server (EES) managing the edge application in an edge cloud site closest to a network connection location in an initial connection of the terminal device to the edge application.

12. The operating method of the edge configuration server of claim 11, wherein the session management information is identified from first connection information, which is connection information allocated to the terminal device in the initial connection of the terminal device, and the session management information comprises second connection information, which is connection information about the edge enable server to which the terminal device previously connects in the initial connection of the terminal device to the edge application.

13. The operating method of the edge configuration server of claim 12, wherein the first connection information comprises connection information that an edge gateway (MEC-GW) identifying network connection of the terminal device differently allocates to the terminal device according to a service area in which the edge gateway is deployed, and the second connection information comprises connection information about an edge enable server deployed in each edge cloud site in each service area of the edge gateway.

14. The operating method of the edge configuration server of claim 12, wherein the transmitting comprises transmitting, to the terminal device, the second connection information in the session management information cached for the terminal device to induce the terminal device to connect to the edge enable server according to the second connection information, when the terminal device is determined to reconnect to the edge application.

15. The operating method of the edge configuration server of claim 12, wherein the determining comprises determining that the terminal device is to connect to the edge application when there is no session management information cached for the terminal device, and the transmitting comprises identifying a specific service area in which an edge gateway (MEC-GW) identifying network connection of the terminal device is deployed from the first connection information that the edge gateway allocates to the terminal device, transmitting the second connection information, which is the connection information about the edge enable server deployed in the specific service area, to the terminal device, and caching the session management information comprising the second connection information for the terminal device, when the terminal device is determined to be initially connected.

16. An operating method of an edge enable server, the method comprising:

determining that a terminal device induced to connect to an edge cloud site closest to a network connection location in an initial connection of the terminal device to the edge application is to reconnect to the edge application; and supporting edge communication between at least one of edge applications managed in the edge cloud site and the terminal device by transmitting, to the terminal device, a list of the edge applications in session management information cached for the terminal device, when the terminal device is determined to reconnect to the edge application.

17. The operating method of the edge enable server of claim 16, wherein the session management information comprises the list of the edge applications generated for the terminal device in the initial connection of the terminal device, and the list comprises at least one edge application matching an edge enable client (EEC) installed in the terminal device of the edge applications managed in the edge cloud site.

18. The operating method of the edge enable server of claim 17, wherein the supporting comprises transmitting, to the terminal device, the list in the session management information cached for the terminal device, and supporting edge communication between the at least one application in the list and the terminal device, when the terminal device is determined to reconnect to the edge application.

19. The operating method of the edge enable server of claim 17, wherein the determining comprises determining that the terminal device is to initially connect to the edge application when there is no session management information cached for the terminal device, and the supporting comprises generating a list of all edge applications managed in the edge cloud site to transmit the list to the terminal device, and caching the session management information comprising a list of at least one edge application identified to match the edge enable client (EEC) in the list of all edge applications upon identifying the at least one edge application from the terminal device, when the terminal device is determined to be initially connected to the edge application.

\* \* \* \* \*